US012769788B2

(12) United States Patent
Bensberg et al.

(10) Patent No.: US 12,769,788 B2
(45) Date of Patent: Oct. 20, 2026

(54) DATA TYPE HANDLING FOR SEMI-STRUCTURED DATA IN A HYBRID RELATIONAL AND SCHEMA-FLEXIBLE DATABASE

(71) Applicant: SAP SE, Walldorf (DE)

(72) Inventors: Christian Bensberg, Heidelberg (DE); Stefano Belloni, Mannheim (DE); Muhammad Waleed Bin Khalid, Heidelberg (DE); Matthias Kemeter, Germersheim (DE); Jin Uk Bae, Seoul (KR); Kyungwook Ko, Seoul (KR); Beom Jin Yun, Seoul (KR); Eun Kyung Chi, Seoul (KR); Sooyoung Kim, Seoul (KR); Taehyung Lee, Seoul (KR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/982,849

(22) Filed: Dec. 16, 2024

(65) Prior Publication Data

US 2026/0170056 A1 Jun. 18, 2026

(51) Int. Cl.
*G06F 16/835* (2019.01)
*G06F 16/21* (2019.01)

(52) U.S. Cl.
CPC .......... *G06F 16/835* (2019.01); *G06F 16/212* (2019.01)

(58) Field of Classification Search
CPC ............................ G06F 16/835; G06F 16/212
USPC ........................................................ 707/769
See application file for complete search history.

(56) References Cited

U.S. PATENT DOCUMENTS

| | | | | |
|---|---|---|---|---|
| 11,030,242 | B1 * | 6/2021 | Borthakur | G06F 16/951 |
| 11,075,951 | B1 * | 7/2021 | Kats | H04L 63/20 |
| 2015/0039587 | A1 * | 2/2015 | Liu | G06F 16/8365 707/718 |
| 2017/0206205 | A1 * | 7/2017 | Neeman | G06F 16/3332 |
| 2022/0245140 | A1 * | 8/2022 | Gylfason | G06F 16/2425 |
| 2023/0141570 | A1 * | 5/2023 | Colmenares Diaz | G06F 16/9024 707/718 |
| 2024/0086464 | A1 * | 3/2024 | Tian | G06F 16/258 |

* cited by examiner

*Primary Examiner* — Giovanna B Colan
(74) *Attorney, Agent, or Firm* — Sterne, Kessler, Goldstein & Fox P.L.L.C.

(57) ABSTRACT

Disclosed herein are a system, method, and computer program product embodiments for enabling document collection creation in accordance with a semi-structured data type, retrieving and filtering data from both relational databases and a document collection, and determining a data type in which the data is retrieved. For example, a statement configured to generate a collection of semi-structured documents in a document store based on a schema is processed. The statement specifies a semi-structured data type in which a plurality of entities from the collection are to be returned from the document store. A determination is made that an entity of the plurality of entities is defined by the schema as being a particular data type different from the semi-structured data type. A query for the entity is provided to the document store. The entity is received, based on the query, in accordance with the particular data type.

20 Claims, 3 Drawing Sheets

DATA TYPE HANDLING FOR SEMI-STRUCTURED DATA IN A HYBRID RELATIONAL AND SCHEMA-FLEXIBLE DATABASE

BACKGROUND

A document database, also referred to as a document store, differs from a traditional relational database. Relational databases generally store data in separate tables with a strict layout that is pre-determined by application developers. Often, a piece of data, i.e. a "data object", may be spread across several tables. Meanwhile, document databases can store all information for a given object in a single unit, and each stored object can differ from other stored objects. In other words, there may be no internal structure that maps directly onto the concept of a table, and the fields and relationships generally do not exist as predefined concepts. Instead, all of the data for an object is placed in a single document, and stored in the document database as a single entry. The structure or layout of the document is part of the stored data itself. This is referred to as semi-structured data. With a document store, there is no need to transform objects into a relational model ("object-relational mapping"). Accordingly, a document store is attractive in applications that are handling semi-structured data. A typical use case is storing JavaScript Object Notation (JSON) documents, which is often used in web applications.

JSON is schema-flexible by nature. In contrast, relational databases comprise tables with well-defined columns and types. When combining JSON-based data with strictly-formatted relational tables or views, various issues occur, including data mismatches due to data type incompatibles. Moreover, the complexity of queries to filter data stored via both JSON documents and relational databases increases.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are a system, apparatus, device, method and/or computer program product embodiments, and/or combinations and sub-combinations thereof, for enabling document collection creation in accordance with a semi-structured data type, retrieving and filtering data from both relational databases and a document collection, and determining a data type in which the data is retrieved. For example, a statement configured to generate a collection of semi-structured documents in a document store based on a schema is processed. The schema is in a semi-structured format, and the statement specifies a first data type in which a plurality of entities from the collection are to be returned from the document store. The first data type is a semi-structured data type. A determination is made that an entity of the plurality of entities is defined by the schema as being a particular data type different from the semi-structured data type. A query for the entity is provided to the document store. The entity is received, based on the query, in accordance with the particular data type instead of the semi-structured data type.

The techniques described herein improve the functioning of a computing system. For example, storing entities in a document store as a semi-structured data type (e.g., a JSON data type) advantageously enables data filtering (e.g., via SELECT statements) to occur at the document store rather than at an SQL layer of an index server. Conventionally, when a query for data is received from an application, a materialized representation of the entire collection storing the data is generated and returned to the SQL layer, and the SQL layer selects the data to be queried from the view. This results in an excess usage of compute resources (e.g., network bandwidth, storage, processing, etc.) because the view is transmitted to the index server and processed by SQL layer. In contrast, by utilizing the JSON data type, entities indicated by the query may be automatically cast to the JSON data type, and the document store may perform the filtering directly on the collections stored thereby. Accordingly, the document store returns just the requested entities rather than a materialization of the entire collection.

Figure 1:
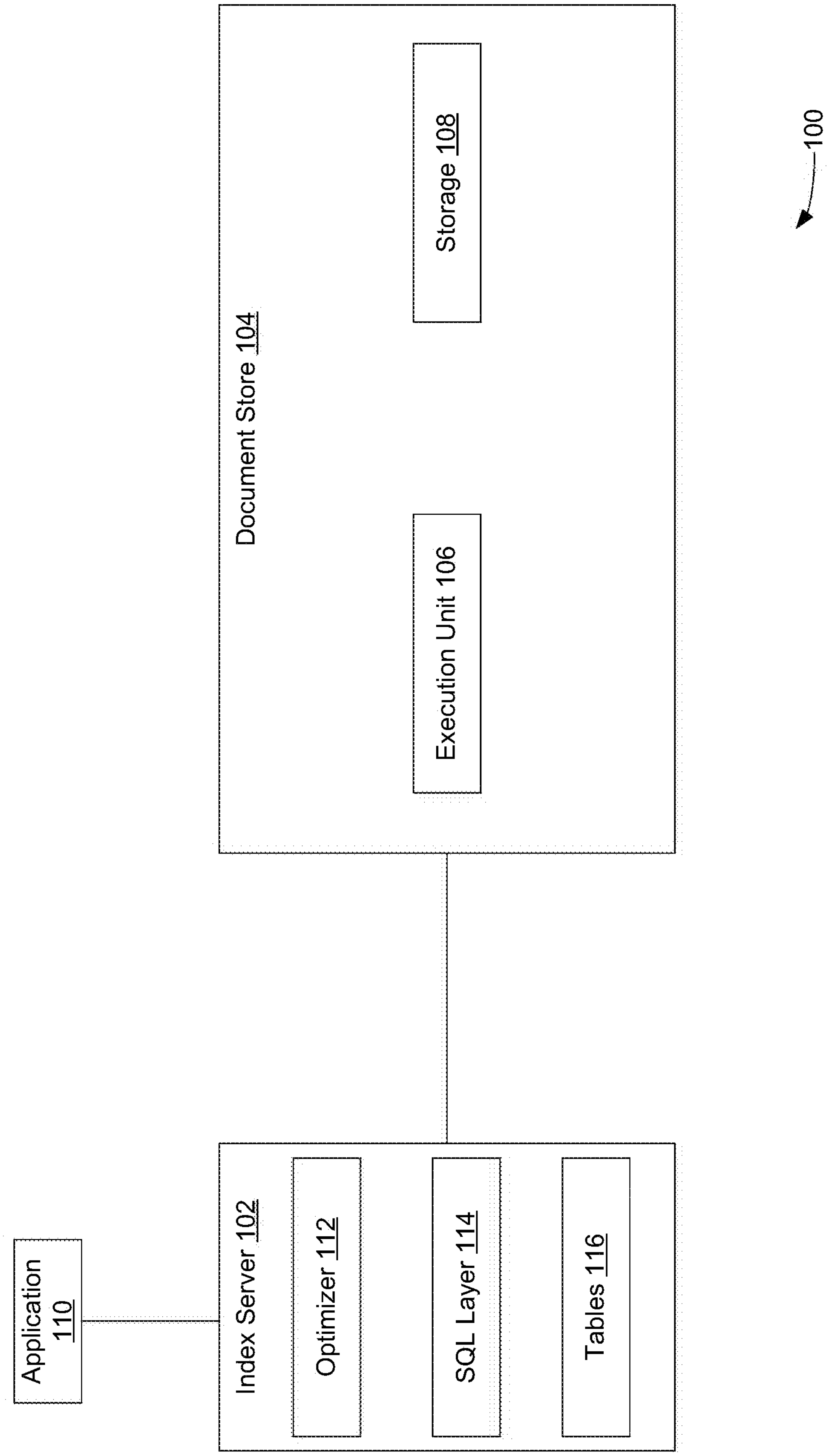
FIG. 1 shows a block diagram of system for retrieving data from relational databases and a document store, according to some embodiments.

FIG. 1 shows a block diagram of system 100 for retrieving data from relational databases and a document store in accordance with a semi-structured data type, according to some embodiments of the disclosure. As shown in FIG. 1, system 100 may include an index server 102, a document store 104, and an application 110. Index server 102 and document store 104 may be collectively referred to as a hybrid relational and schema-flexible database as both row and/or column data of a relational database and schema-flexible data (e.g., JSON data) may be stored and collectively operated on. Index server 102, document store 104, and application 110 may be communicatively coupled via one or more networks. Examples of such network(s) include, but are not limited to local area networks (LANs), wide area networks (WANs), enterprise networks, the Internet, etc., and may include one or more of wired and/or wireless portions. Index server 102 and document store 104 may be located in a server, a computer system, and/or a database management system.

As shown in FIG. 1, document store 104 may include an execution unit 106 and storage 108. The data stored by document store 104 may be stored as one or more collections, where each collection comprises a plurality of semi-structured documents (e.g., JSON documents). This advantageously allows data to be grouped together more logically and naturally and also allows native operations on JSON, including filtering, aggregation, and joining JSON documents with column or row store tables. Each of the database entities (e.g., objects) represented by the JSON documents may be stored in storage 108 in accordance with one of a plurality of different data types. Examples of data types in which an entity may be stored include, but are not limited to, a double data type (where floating point values are stored as an 8-byte value, a decimal data type (where floating point values are stored as 16-byte values, an integer data type (comprising varying byte lengths, e.g., 1 byte, 2 bytes, 4 bytes, etc.), a string data type, an array data type, an object data type, a Boolean value, a null value, or a JavaScript Objection Notation (JSON) data type. Storing floating point values as a decimal data type reduces the precision loss (however, at the cost of additional memory). In some embodiments, floating point values may be stored in a compressed format (rather than utilizing all 16 bytes), where the mantissa and exponent values representative of a particular floating point value are stored using the smallest number of bytes required to represent the floating point value. For instance, consider the number 4.5. Here, the mantissa value would be 45 and the exponent value would be −1. In this example, only three bytes would be required to store the floating point value (e.g., one byte to represent 45, another byte to represent −1, and one byte for the sign). Storage 108 may include one or more hard disk storage devices, solid state storage devices, and/or one or more caches, and may be located internally (as shown in FIG. 1) or externally to document store 104.

Each of index server 102 and document store 104 may be maintained by one or more computing devices, such as, but not limited to, one or more computer systems, servers, cloud systems, cloud servers, laptops, desktops, personal computers, and the like. In some embodiments, index server 102 and document store 104 may be located in different hardware devices or a same hardware device. For example, index server 102 and document store 104 may form a distributed system.

Index server 102 may be configured to manage and provide data retrieval processes. For example, the index server 102 may receive one or more statements and/or queries from application 110 (e.g., a client application). Such statements and queries may be in accordance with a structured query language (SQL). Such statements and queries may be configured to create document collections and/or request index server 102 to retrieve data from document store 104 and/or tables 116 of a row and/or column store associated with a relational database (not shown). Application 110 may be configured to execute via one or more computing devices, for example, one or more computer systems, servers, cloud systems, cloud servers, laptops, desktops, personal computers, and the like.

Index server 102 may comprise an optimizer 112 and an SQL layer 114. Optimizer 112 may be configured to generate logical query execution plans based on statements and queries received from application 110. For example, the logical execution plans may indicate high-level logical steps required to execute the statements and/or queries. Index server 102 may transmit the logical execution plans to execution unit 106 of document store 104.

SQL layer 114 of index server 102 may be configured to perform search and/or filtering operations (e.g., a SELECT operation) involving at least one of document store 104 and tables 116 (e.g., columns and/or rows thereof) stored at index server 102. For example, SQL layer 114 may pull data from these two sources and perform processing on (e.g., join) the combined data set. SQL layer 114 may subsequently provide the pulled and/or processed data to application 110.

Execution unit 106 of document store 104 may be configured to execute the statements and/or queries provided by SQL layer 114 in accordance with the execution plans to retrieve the requested data (e.g., entities from one or more JSON documents) from storage 108.

In some embodiments, an SQL statement configured to create a collection may enable a user to specify the data type in which data from the collection is to be returned to SQL layer 114. For instance, the SQL statement may comprise one or more keywords that designate such a data type. In one example, the SQL statement may be as follows:

CREATE COLLECTION myCollection RETURNING NVARCHAR (Example 1)

In the example above, the CREATE statement is configured to create a collection named "myCollection" that returns data in accordance with an NVARCHAR data type (e.g., a variable-sized string). The keywords or clause "RETURNING NVARCHAR" specify the data type in which data is to be returned (i.e., NVARCHAR). When compiling a query execution plan, optimizer 112 may set an internal flag in document store 104 that indicates that data is to be returned in accordance with the NVARCHAR data type. When returning data to SQL layer 114, execution unit 106 may convert the data being returned to the NVARCHAR data type (in the event that the data being returned is not stored as an NVARCHAR data type). If the SQL statements use casts, corresponding data types will be used instead of NVARCHAR.

The following example is an SQL statement that is configured to create a collection that returns data in accordance with a JSON data type:

CREATE COLLECTION myCollection RETURNING JSON (Example 2)

In the example above, the CREATE statement is configured to create a collection named "myCollection" that returns data in accordance with a JSON data type. The keywords or clause "RETURNING JSON" specify the data type in which data is to be returned (i.e., JSON). When compiling a query execution plan, optimizer 112 may set an internal flag in document store 104 that indicates that data is to be returned in accordance with the JSON data type. When returning data to SQL layer 114, execution unit 106 return the JSON data in its native JSON data type.

In some embodiments, a user may be enabled to change the data type in which data is returned from a collection, e.g., by using an ALTER statement. For example, suppose a collection has been created in which data from that collection is to be returned as a JSON data type. A user may change the data type as follows:

ALTER COLLECTION myCollection RETURNING NVARCHAR (Example 3)

In the example SQL statement above, optimizer 112 may update the internal flag in document store 104 to indicate that data is to be returned in accordance with the NVARCHAR data type.

In another example, suppose a collection has been created in which data from that collection is to be returned as an NVARCHAR data type. A user may change the data type as follows:

ALTER COLLECTION myCollection RETURNING JSON (Example 4)

In the example SQL statement above, optimizer 112 may update the internal flag in document store 104 to indicate that data is to be returned in accordance with the JSON data type.

Storing entities in document store 104 as a JSON data type advantageously enables data filtering (e.g., via SELECT statements) to occur at document store 104 rather than at SQL layer 114. An SQL view can be used to access data in the document store collection. The data then needs to be transformed from the schema-flexible JSON to a strict schema that adheres to SQL conventions. The result of the view may then be used in other SQL statements or combined directly in conjunction with queries on tables. Queries executed solely within the document store 104, by execution unit 106, follow JSON semantics. An example of this is the handling of a certain field, e.g. "age", where the value for some documents is of type integer, but of type string for other documents. When the data is converted for processing in SQL layer 114, for the mentioned view, then the data type needs to be made specific and casts may need to be applied. That may mean that when a query for data is received from application 110, a materialization of the entire collection storing the data is generated and returned to SQL layer 114, and SQL layer 114 selects the data to be queried from the view. SQL layer 114 may then apply filters on the data using SQL semantics. This results in an excess usage of compute resources (e.g., network bandwidth, storage, processing, etc.) because the materialized view data is transmitted to index server 102 and processed by SQL layer 114. This is necessary as for example the filtering semantics in document store 104 on JSON data are different than the SQL compliant filtering semantics in SQL layer 114. In contrast, by utilizing the JSON data type, SQL layer 114 also becomes capable to process JSON data with the same JSON semantics used in document store 104. This means that document store 104 may return JSON data to index server 102 for further processing. Optimizer 112 may determine where data shall be processed and where which parts of the execution shall take place. The result set of the query will be identical, irrespective of decision made by optimizer 112 or execution location. In this way, optimizer 112 may determine to push filters to document store 104, and execution engine 106 may perform the filtering. Accordingly, execution unit 106 returns just the requested entities rather than a materialization of all the documents that will only be filtered in index server 102. If required by the query, the returned entities may be joined with data from tables 116 by SQL layer 114.

For example, consider the following SQL query:

(Example 5)

```
SELECT c."name", c."address"."city", t."age" FROM "customers" AS c
INNER JOIN "ageTable" AS t ON c."name" = t."name"
```

This query is configured to match names from the collection "customers" and the table "ageTable" and return the city and ages associated with those names. In an embodiment in which document store 104 stores names, addresses and ages in the collection "customers" as a JSON data type, SQL layer 114 may implicitly cast t. "name" (i.e., names from the table "ageTable") to the JSON data type so that the comparison between the names stored in the collection of document store 104 and the names stored in the table (e.g., tables 116) will be between names being of the JSON data type. Execution unit 106 returns the determined names and cities from the "customers" collection to SQL layer 114, and SQL layer 114 matches the returned names with the names from the table "ageTable" stored in tables 116. SQL layer 114 then returns the matched names, and associated cities and ages to application 110.

The SQL query in example 5 performs a join, which is executed by index server 102. The join operation is performed on data received from document store 104 over the network to index server 102. Without any optimization, the items in the projection list of the query are sent back to index server 102 for all the documents stored in the collection. If the document volume is very high, this can lead to large query execution times, as a lot of data has to be materialized. A semi-join reduction optimization scheme may be applied to mitigate this issue depending on the join predicate.

Such an optimization produces an alternate plan in the optimizer 112 such that the join predicate (hereafter referred to as filter) is pushed down to document store 104. This allows filtering to take place in document store 104 before data is sent over the network to index server 102. Documents that do not pass the filter are removed from the projection list returned to index server 102, which results in lower data volume passed over the network, thereby effectively speeding up the join query. This is performed depending on the cost involved by evaluating the selectivity of the filter. The selectivity of a filter can be determined using statistics about the data stored in document store 104 such as count, distinct count, null count, minimum, and maximum. Filters that are selective, i.e., that would reduce the amount of data sent over the network, are pushed down whereas filters that are not selective are not, as this would be additional overhead without substantial benefits.

The compare semantics of the filter pushdown and the join will always be aligned, but will follow the return type of the collection. If the collection is returning JSON, the join algorithm will use JSON semantics to perform comparisons. Similarly, if the join predicate is pushed down to document store 104, the same compare semantics will be used. This is in contrast to a collection returning NVARCHAR, where both the join and the pushed down filter will follow SQL semantics. The two semantics may not be identical, for example, when comparing the string "100" with the integer 100. According to SQL semantics, the two are equal as type promotion takes place. However, according to JSON semantics, the two are not equal. Therefore, in the case of returning NVARCHAR, the comparison would succeed, and an additional record will be returned. However, in the case of returning JSON case, the comparison would fail and the corresponding record will not be returned.

In some embodiments, collections may be created in accordance with a JSON schema. The schema may explicitly specify data types for different entities defined by the schema. The data types specified by the schema may override the internal flag set by optimizer 112, as described above. For example, consider the following SQL statement:

(Example 6)

```
CREATE COLLECTION "people" JSON '{
  "$schema": "http://json-schema.org/draft-07/schema#",
  "type": "object",
  "properties": {
  "name": {
    "type": "string"
  },
  "age": {
    "type": "integer"
  }
}') RETURNING JSON;
```

In the example above, the CREATE statement is configured to create a collection named "people" that returns data in accordance with a JSON data type. The CREATE statement also specifies a JSON schema that defines various properties (such as the data type) for entities specified therein. For example, the name entity is specified as a string data type, and the age entity is specified as an integer data type. When execution unit 106 returns a name from the collection "people" to SQL layer 114, the name is returned as a string data type and not a JSON data type. When execution unit 106 returns an age from the collection "people" to SQL layer 114, the age is returned as an integer data type and not a JSON data type. However, any entities that do not have its data type defined by the JSON schema are returned as a JSON data type. Accordingly, the data types specified by the JSON schema supersedes the RETURNING JSON keywords (i.e., the JSON schema supersedes the internal flag set based on the RETURNING JSON keywords).

In some embodiments, the JSON schema may specify multiple data types for a particular property. For example, consider the following CREATE statement:

(Example 7)

```
CREATE COLLECTION myC JSON '{
  "$schema": "http://json-schema.org/draft-07/schema#",
  "type": "object",
  "properties": {
  "id": {
    "type": ["integer", "null"]
  },
  "order" {
    "type": "null"
  }
}') RETURNING JSON;
```

In the example shown above, the data types specified for the "id" entity as "integer" and "null." That is, the value stored for the "id" entity in a database column may either be an integer value or may not comprise any value (i.e., a null value). When a query statement (e.g., a SELECT statement) for retrieving a column comprising the "id" entity is executed by execution unit 106, the data returned will include either integer values or null values. Similarly, the "order" entity is also indicated as having a null data type. As such, no value may be specified for the "order" entity. When a query statement (e.g., a SELECT statement) for retrieving a column comprising the "order" entity is executed by execution unit 106, the column of data returned will be returned as either NVARCHAR or JSON (depending on the RETURNING clause) and all values for the "order" entity will be null values.

In some embodiments, the JSON schema may specify a maximum value for a particular entity. For example, consider the following CREATE statement:

(Example 8)

```
CREATE COLLECTION myC JSON '{
  "$schema": "http://json-schema.org/draft-07/schema#",
  "type": "object",
  "properties": {
  "id": {
    "maximum": 100
  },
  "order" {
    "type": ["string", "integer"]
  }
}') RETURNING JSON;
```

In the example shown above, the JSON schema specifies a maximum value for the entity "id." Any value that exceeds the maximum value is not allowed. Accordingly, when compiling an execution plan, optimizer 112 may check queries for columns including the "id" entity and ensure that the value for this entity does not exceed the specified maximum value (e.g., 100). As also shown above, the JSON schema does not specify a data type for the "id" entity. Accordingly, the data type for the "id" entity defaults to the data type specified by the RETURNING clause (in this case the JSON data type). As further shown in the example above, the possible data types specified for the "order" entity are "string" and "integer"). Accordingly, the values stored for the "order" entity may by any of string or integer. As this does not map to a single primitive SQL data type, document store 104 will return the data using the JSON data type.

In some embodiments, the JSON schema may specify a Boolean value for a particular entity. For example, consider the following CREATE statement:

(Example 9)

```
CREATE COLLECTION myC JSON '{
  "$schema": "http://json-schema.org/draft-07/schema#",
  "type": "object",
  "properties": {
    "id": true,
    "order" : false
  }
}') RETURNING JSON;
```

In the example shown above, the Boolean value specified for the "id" entity is "true". When this value is specified, optimizer 112 determines during compilation of an execution plan that any data type is allowed for the "id" entity. When returning data to SQL layer 114, execution unit 106 may return the data in accordance with the data type specified by the RETURNING clause (in this case JSON) because the data type is not explicitly defined by the JSON schema. As further shown in the example above, the Boolean value specified for the "order" entity is "false". When this value is specified, optimizer 112 determines during compile time that the document must not have an "order" entity. When a query statement is received for retrieving the "order" entity, an error message is returned indicating that the "order" path Expression cannot be resolved; according to the JSON schema, it must not exist.

Figure 2:
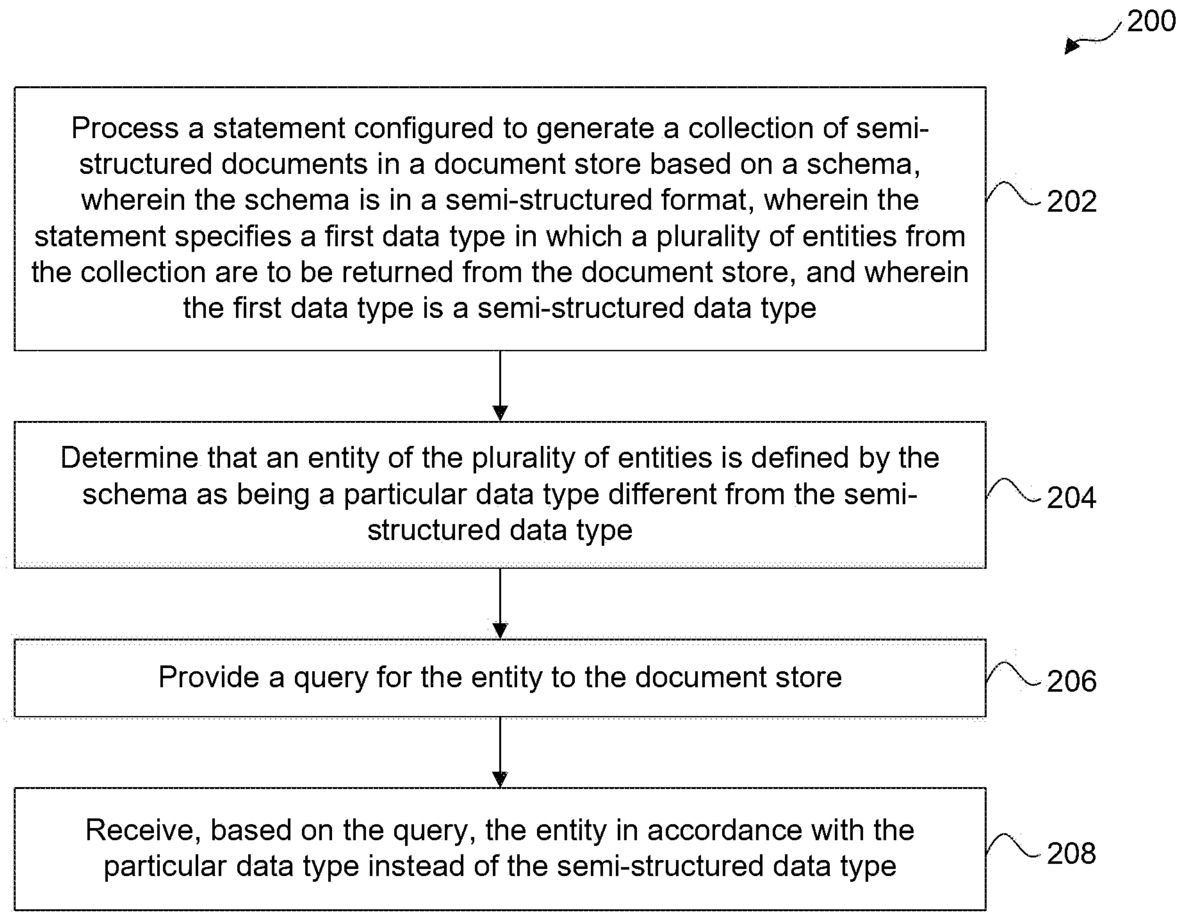
FIG. 2 is a flowchart of a method for determining a data type in which data is to be returned from a document store, according to some embodiments.

FIG. 2 is a flowchart of a method 200 for determining a data type in which data is to be returned, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

Method 200 shall be described with reference to FIG. 1. However, method 200 is not limited to that example embodiment.

At 202, optimizer 112 of index server 102 may process a statement configured to generate a collection of semi-structured documents in document store 104 based on a schema. The schema may be in a semi-structured format, and the statement may specify a first data type in which a plurality of entities from the collection are to be returned from document store 104. The first data type may be a semi-structured data type. In some embodiments, the semi-structured data type is a JSON-based data type.

For example, referring to Example 6 above, the statement may be a CREATE statement configured to generate a collection of JSON documents named "people" in accordance with a JSON schema. The CREATE statement also comprises a RETURNING JSON clause, which specifies that the plurality of entities from the collection are to be returned as JSON data types. Optimizer 112 may set an internal flag in document store 104 that indicates that entities are to be returned in accordance with the JSON data type.

In some embodiments, the plurality of entities is stored in document store 104 in accordance with at least one of the following data types: an 8-byte integer value, an 8-byte floating point value (e.g., a double data type), a 16-byte floating point value (e.g., a decimal data type), a string value (e.g., an NVARCHAR data type), a Boolean value, an array, an object, or a null value.

At 204, optimizer 112 may determine that an entity of the plurality of entities is defined by the schema as being a particular data type different from the semi-structured data type. For example, as shown in Example 6 above, the JSON schema specifies that the data value for "age" has an integer data type, which is different than the JSON data type specified by the RETURNING JSON clause. The data type specified by the JSON schema overrides the JSON data type specified by the RETURNING JSON clause. Accordingly, optimizer 112 may provide an indication to execution unit 106 that indicates that execution unit 106 is to provide the age as an integer data type.

At 206, SQL layer 114 of index server 102 may provide a query for the entity to document store 104. For instance, the query may be as follows: SELECT "id" from myCollection. Execution unit 106 may execute the query to retrieve the entity from storage 108.

At 208, SQL layer 114 of index server 102 may receive, based on the query, the entity in accordance with the particular data type instead of the semi-structured data type. For example, execution unit 106 may retrieve the entity from storage 108. If the entity is stored an integer in storage 108, then execution unit 106 provides the age to SQL layer 114 as is. However, if the entity is stored a different data type (e.g., a string or a floating point value), then execution unit 106 may convert the age into an integer and provide the converted age to SQL layer 114. Execution unit 106 does not provide the age as a JSON data type because the JSON schema explicitly specifies that age is to be returned as an integer data type.

In some embodiments, optimizer 112 may process another statement that changes the first data type to a second data type such that the plurality of entities from the collection are to be returned in accordance with the second data type. The statement may be an ALTER statement that includes a RETURNING clause specifying the second data type, for example, as shown above with reference to Example 3. In some embodiments, the first data type is a JSON data type and the second data type is a string-based data type (e.g., an NVARCHAR data type).

In some embodiments, another entity of the plurality of entities is defined by the schema as being a null data type, and wherein the null data type indicates that the other entity comprises a null value. For example, with reference to Example 7 above, the JSON schema specifies that the "order" entity is of a null data type, thus all values returned for the "order" entity" are null values.

In some embodiments, another entity of the plurality of entities is defined by the schema as being one of a first Boolean value or a second Boolean value. The first Boolean value indicates that any data type is assignable to the other entity, and the second Boolean value indicates that no data type is assignable to the other entity. For example, with reference to Example 9 above, the JSON schema specifies that the "id" entity is assigned first Boolean value (e.g., "true"), thereby indicating that any data type is assignable to the "id" entity. As further shown in Example 9 above, the "order" entity is assigned a second Boolean value (e.g., "false"), thereby indicating the "order" entity must not be specified.

In some embodiments, the other entity is defined by the schema as being the second Boolean value (i.e., the other entity is assigned the second Boolean value). Optimizer 112 may process a query configured to return the other entity (e.g., "order"), and generate an error message indicating that the other entity is not returnable based on processing the query. For example, while generating a query execution plan, optimizer 112 may analyze the query and determine whether it is requesting an entity that is assigned the second Boolean value. If so, optimizer 112 may generate the error message.

In some embodiments, the schema specifies a maximum value for another entity of the plurality of entities. For example, with reference to Example 8 above, the JSON schema specifies a maximum value of 100 for the "id" entity. Any value that exceeds the maximum value is not allowed. Accordingly, when compiling an execution plan, optimizer 112 may check queries for columns including the "id" property and ensure that the value for this property does not exceed the specified maximum value (e.g., 100).

Figure 3:
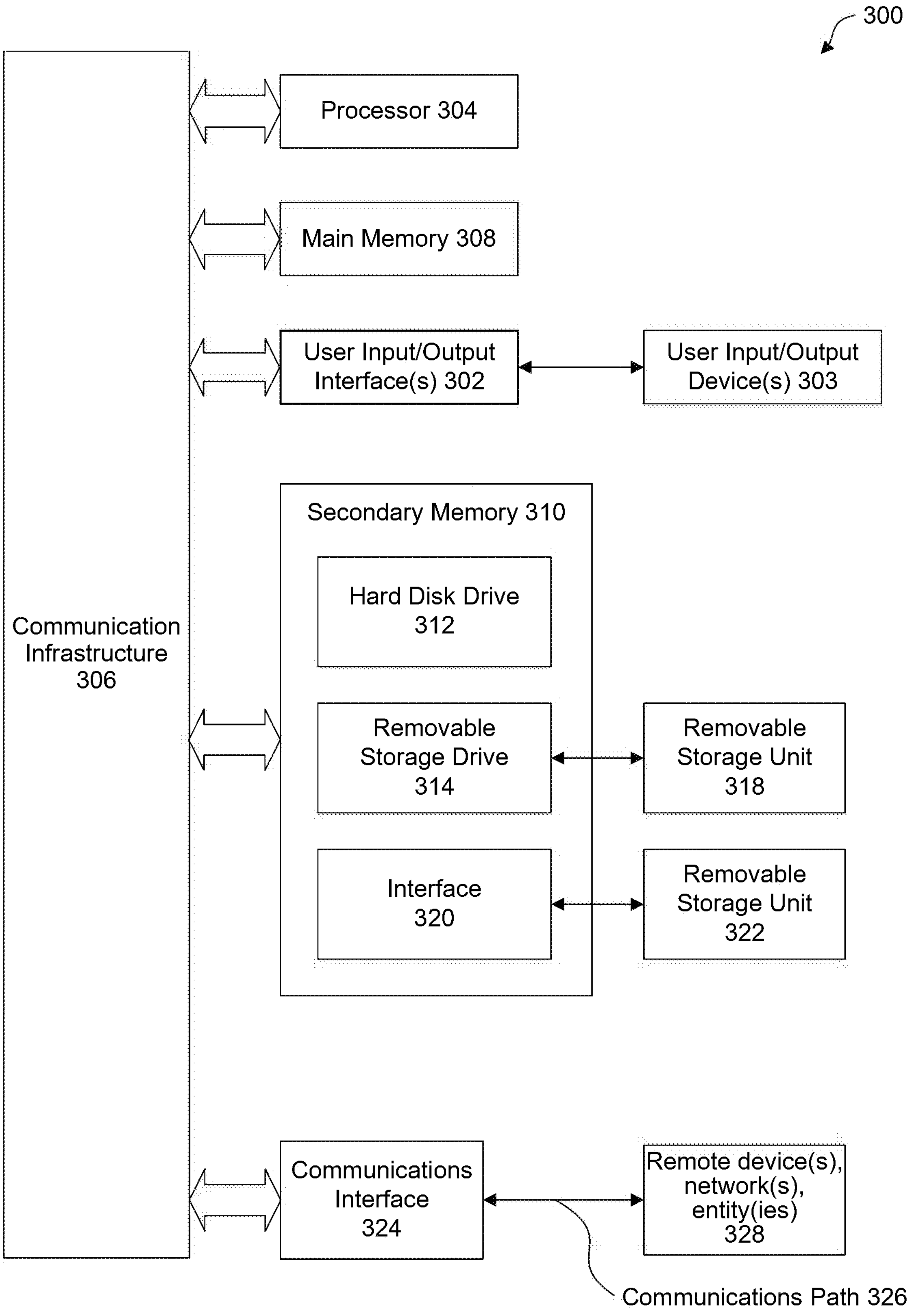
FIG. 3 is an example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:

processing a statement configured to generate a collection of semi-structured documents in a document store based on a schema, wherein the schema is in a semi-structured format, wherein the statement comprises a keyword that specifies a first data type in which a plurality of entities from the collection are to be returned from the document store, and wherein the first data type is a semi-structured data type;

determining that an entity of the plurality of entities is defined by the schema as being a particular data type different from the semi-structured data type;

overriding the first data type specified by the keyword with the particular data type defined by the schema;

providing a query for the entity to the document store; and receiving, based on the query, the entity in accordance with the particular data type that overrides the semi-structured data type.

2. The method of claim 1, further comprising processing another statement that changes the first data type to a second data type such that the plurality of entities from the collection are to be returned in accordance with the second data type.

3. The method of claim 2, wherein the semi-structured data type is a JavaScript Object Notation (JSON)-based data type, and wherein the second data type is a string-based data type.

4. The method of claim 1, wherein the plurality of entities is stored in the document store in accordance with at least one of the following data types:

an 8-byte integer value;

an 8-byte floating point value;

a 16-byte floating point value;

a string value;

a boolean value;

an array;

an object; or a null value.

5. The method of claim 1, wherein another entity of the plurality of entities is defined by the schema as being a null data type, and wherein the null data type indicates that the other entity comprises a null value.

6. The method of claim 1, wherein another entity of the plurality of entities is defined by the schema as being one of a first Boolean value or a second Boolean value, wherein the first Boolean value indicates that any data type is assignable to the other entity, and wherein the second Boolean value indicates that the other entity is not specifiable.

7. The method of claim 6, wherein the other entity is defined by the schema as being the second Boolean value, and wherein the method further comprises:

processing a query configured to return the other entity; and generating an error message indicating that the other entity is not returnable based on processing the query.

8. The method of claim 1, wherein the schema specifies a maximum value for another entity of the plurality of entities.

9. A system, comprising:

a memory; and at least one processor coupled to the memory and configured to:

process a statement configured to generate a collection of semi-structured documents in a document store based on a schema, wherein the schema is in a semi-structured format, wherein the statement comprises a keyword that specifies a first data type in which a plurality of entities from the collection are to be returned from the document store, and wherein the first data type is a semi-structured data type;

determine that an entity of the plurality of entities is defined by the schema as being a particular data type different from the semi-structured data type;

override the first data type specified by the keyword with the particular data type defined by the schema;

provide a query for the entity to the document store; and receive, based on the query, the entity in accordance with the particular data type that overrides the semi-structured data type.

10. The system of claim 9, wherein the at least one processor is further configured to process another statement that changes the first data type to a second data type such that the plurality of entities from the collection are to be returned in accordance with the second data type.

11. The system of claim 10, wherein the semi-structured data type is a JavaScript Object Notation (JSON)-based data type, and wherein the second data type is a string-based data type.

12. The system of claim 9, wherein the plurality of entities is stored in the document store in accordance with at least one of the following data types:

an 8-byte integer value;

an 8-byte floating point value;

a 16-byte floating point value;

a string value;

a boolean value;

an array;

an object; or a null value.

13. The system of claim 9, wherein another entity of the plurality of entities is defined by the schema as being a null data type, and wherein the null data type indicates that the other entity comprises a null value.

14. The system of claim 9, wherein another entity of the plurality of entities is defined by the schema as being one of a first Boolean value or a second Boolean value, wherein the first Boolean value indicates that any data type is assignable to the other entity, and wherein the second Boolean value indicates that the other entity is not specifiable.

15. The system of claim 14, wherein the other entity is defined by the schema as being the second Boolean value, and wherein the at least one processor is further configured to:

process a query configured to return the other entity; and generate an error message indicating that the other entity is not returnable based on processing the query.

16. The system of claim 9, wherein the schema specifies a maximum value for another entity of the plurality of entities.

17. A non-transitory computer-readable device having instructions stored thereon that, when executed by at least one computing device, cause the at least one computing device to perform operations, the operations comprising:

processing a statement configured to generate a collection of semi-structured documents in a document store based on a schema, wherein the schema is in a semi-structured format, wherein the statement comprises a keyword that specifies a first data type in which a plurality of entities from the collection are to be returned from the document store, and wherein the first data type is a semi-structured data type;

determining that an entity of the plurality of entities is defined by the schema as being a particular data type different from the semi-structured data type;

overriding the first data type specified by the keyword with the particular data type defined by the schema;

providing a query for the entity to the document store; and receiving, based on the query, the entity in accordance with the particular data type that overrides the semi-structured data type.

18. The non-transitory computer-readable device of claim 17, the operations further comprising processing another statement that changes the first data type to a second data type such that the plurality of entities from the collection are to be returned in accordance with the second data type.

19. The non-transitory computer-readable device of claim 18, wherein the semi-structured data type is a JavaScript Object Notation (JSON)-based data type, and wherein the second data type is a string-based data type.

20. The non-transitory computer-readable device of claim 17, wherein the plurality of entities is stored in the document store in accordance with at least one of the following data types:

an 8-byte integer value;

an 8-byte floating point value;

a 16-byte floating point value;

a string value;

a boolean value;

an array;

an object; or a null value.

* * * * *